US012753012B2

(12) United States Patent
Schuberth et al.

(10) Patent No.: US 12,753,012 B2
(45) Date of Patent: Oct. 6, 2026

(54) BELT CONVEYOR DEVICE FOR LUMPY PRODUCTS AND DEVICE AND METHOD FOR REMOVING PRODUCTS FROM A PRODUCT FLOW

(71) Applicant: LOESCH Verpackungstechnik GmbH + Co. KG, Altendorf (DE)

(72) Inventors: Michael Schuberth, Altendorf (DE); Rupert Schmid, Scheblitz (DE)

(73) Assignee: LOESCH VERPACKUNGSTECHNIK GMBH + CO. KG, Altendorf (DE)

( * ) Notice: Subject to any disclaimer, the term of this patent is extended or adjusted under 35 U.S.C. 154(b) by 41 days.

(21) Appl. No.: 18/849,672

(22) PCT Filed: May 20, 2022

(86) PCT No.: PCT/EP2022/063719
§ 371 (c)(1),
(2) Date: Sep. 23, 2024

(87) PCT Pub. No.: WO2023/222236
PCT Pub. Date: Nov. 23, 2023

(65) Prior Publication Data

US 2025/0214782 A1 Jul. 3, 2025

(51) Int. Cl.
*B65G 21/10* (2006.01)
*B65G 47/53* (2006.01)
*B65G 47/64* (2006.01)

(52) U.S. Cl.
CPC ............. *B65G 21/10* (2013.01); *B65G 47/53* (2013.01); *B65G 47/647* (2013.01)

(58) Field of Classification Search
CPC ....... B65G 21/10; B65G 47/53; B65G 47/647
See application file for complete search history.

(56) References Cited

U.S. PATENT DOCUMENTS 3,075,325 A 1/1963 Liedtke
3,224,758 A * 12/1965 Siempelkamp .......... B27N 3/18
271/69

(Continued)

FOREIGN PATENT DOCUMENTS

CH 709921 A1 1/2016
CH 709921 B1 * 9/2019 ............. B65G 47/52

(Continued)

*Primary Examiner* — James R Bidwell
(74) *Attorney, Agent, or Firm* — Cisto & Thomas LLP

(57) ABSTRACT

A belt conveying device for conveying products from a first position to a second position and discharged from the belt conveying device, the belt conveying device having a carriage, which is movable back and forth between a rear position in the conveying direction and a front position, and which has an upper side and a lower side; a stationary carrier device which is arranged below the carriage; a conveyor belt which carries the products and which is formed and held on the carriage configured to move on the upper side of the carriage in or against the conveying direction relative to the carriage or is stationary relative to the carriage when the carriage moves or when it is stationary, so that movement of the products from the first to the second position is caused by the movement of the carriage, the movement of the conveyor belt, or movement of both.

16 Claims, 11 Drawing Sheets

(56) References Cited

U.S. PATENT DOCUMENTS

| | | | |
|---|---|---|---|
| 3,507,091 | A | 4/1970 | Gillespie |
| 4,617,780 | A | 10/1986 | Focke |
| 5,056,294 | A | 10/1991 | Focke |
| 6,047,529 | A | 4/2000 | Draghetti |
| 6,328,152 | B1 | 12/2001 | Focke |
| 2010/0278625 | A1 | 11/2010 | Wolkerstorfer |
| 2012/0241339 | A1 | 9/2012 | Buse |
| 2014/0138517 | A1 | 5/2014 | Hammacher |
| 2017/0203927 | A1 | 7/2017 | Philipp |
| 2022/0274789 | A1 | 9/2022 | Philipp |

FOREIGN PATENT DOCUMENTS

| | | | | | |
|---|---|---|---|---|---|
| CH | 716151 | A1 | | 11/2020 | |
| DE | 29815784 | U1 | | 10/1998 | |
| DE | 20210214 | U1 | | 1/2003 | |
| EP | 0591670 | A1 | | 4/1994 | |
| EP | 0786425 | A2 | * | 7/1997 | ........... B65G 47/647 |
| EP | 795474 | A1 | | 9/1997 | |
| EP | 1640294 | A2 | * | 3/2006 | ............. B65G 47/53 |
| WO | 2008046191 | A1 | | 4/2008 | |
| WO | 2009094681 | A1 | | 8/2009 | |
| WO | 2013088412 | A2 | | 6/2013 | |
| WO | 2016012229 | A2 | | 1/2016 | |
| WO | 2016012229 | A3 | | 1/2016 | |
| WO | 2020225281 | A1 | | 11/2020 | |
| WO | 2023169941 | A1 | | 9/2023 | |

* cited by examiner

BELT CONVEYOR DEVICE FOR LUMPY PRODUCTS AND DEVICE AND METHOD FOR REMOVING PRODUCTS FROM A PRODUCT FLOW

The invention relates to a belt conveyor device for lumpy products and to a device and a method for discharging products from a product stream which use a belt conveyor device according to the invention.

In the field of the production and packaging of lumpy products of the food industry, in particular confectionery, such as chocolate plates and bars, chocolates, biscuits, cereal bars, cakes and other confectionery of all types, it is known to provide devices for discharging or removing individual products or product rows or product groups from a product stream arriving, for example, from product production, in order to feed the products, for example in portions and/or in defined quantities or groups and/or in defined arrangements, to a packaging machine or to another device for further processing. Herein, the conveying devices are usually belt conveying devices, i.e. belts or bands, with which the products are conveyed and handled in as positionally stable and gentle a manner as possible.

In such a product discharging device or product removal device, the products are initially typically fed in a main conveying direction on a product feeding belt or main belt. While the main product stream is typically conveyed further on the main belt, the products or product groups to be discharged are branched off from the main product stream by being transferred from the main belt directly or indirectly to a discharging belt or removal belt. On this discharging belt, the products are then usually conveyed further in a direction which extends substantially transversely or perpendicularly to the main conveying direction. From the discharging belt, the products are then transferred to a downstream packaging machine or another device for further processing.

In order to accomplish the discharging of the products from the main belt, the main belt generally does not consist of a continuous belt, but of at least two belts arranged one behind the other without gaps. Herein, the first belt in the conveying direction, i.e. arranged upstream, is designed as a switch belt with a front, i.e. arranged downstream, lowerable belt nose or belt edge. For discharging the products from the product stream, the belt nose is lowered onto the typically somewhat lower downstream conveyor belt and transfers the products to this belt.

In order to accomplish a decoupling of input-side product production and output-side product packaging and at the same time a continuous, synchronized feeding of a packaging machine with products, it is advantageous to provide an intermediate storage belt or waiting belt or buffer belt between the main belt and the discharging belt. The products to be discharged from the main product stream are thereby transferred from the main belt indirectly to the discharging belt by being transferred from the main belt first to the intermediate storage belt and from the latter then to the discharging belt. The intermediate storage belt is therein usually arranged in the main conveying direction substantially behind and/or below the product feeding belt or main belt, respectively, and conveys the products received from the product feeding belt further substantially in the main conveying direction. The following discharging belt is arranged in the main conveying direction substantially behind the intermediate storage belt and then conveys the products received from the intermediate storage belt further in a direction substantially transversely or perpendicularly to the main conveying direction. Here, however, any other orientations are also conceivable, e.g. obliquely to the main conveying direction.

The intermediate storage belt generally serves as a buffer place for the products discharged from the main product stream before they are transferred to the discharging belt or removal belt, respectively. It is thereby possible, for example, that a plurality of product groups to be discharged from the main product stream can be processed simultaneously by, e.g. in the time period during which a first product group is conveyed off on the discharging belt, a further product group being able to be removed from the main product stream and being pre-buffered on the intermediate storage belt until the discharging belt is free and can be fed with this pre-buffered product group. As a result, any desired quantities of products or product groups can typically be removed from the main product stream and fed to a downstream packaging machine depending on its performance.

The intermediate storage belt can typically be configured as a so-called pull-nose belt or is based in its function substantially on the principle of a pull-nose device or has elements of a pull-nose device. Pull-nose belts are generally length-adjustable belts, in which the front belt edge or belt nose is displaceable forwards or backwards, while the conveyor belt runs.

In this sense, in the case of the above-described intermediate storage belt, a combination of two movement sequences typically takes place, namely, on the one hand, the movement of the conveyor belt or band as such and, on the other hand, a translational or linear displacement of the intermediate storage belt as a larger assembly group, that is to say, for example, the conveyor belt including the carrier or holding devices and the drive and guide means for the conveyor belt, such as, for example, the drive motor, deflection rollers and/or guide surfaces for the conveyor belt. In this case, the conveyor belt as such and the said larger assembly group can move both forwards and backwards, that is to say in the conveying direction or counter to the conveying direction, or they can stand still while the respective other unit moves. In this case, any desired combinations of these movement sequences are conceivable.

The movement of the conveyor belt of the intermediate storage belt as such typically serves to convey the products in the conveying direction from a first position, in which they are received coming from the product feeding belt or main belt, into a second position downstream, in which they are discharged to the downstream discharging belt. In this case, the products are pushed down from the conveyor belt on account of the further movement of the latter.

The movement of the translational or linear displacement of the intermediate storage belt as a whole, that is to say as a larger assembly group mentioned above, typically serves to position the front belt edge or belt nose on and/or above the discharging belt in such a way that the products are placed correctly aligned, in the correct position, for example centered, on the discharging belt when they are pushed down from the conveyor belt as such by the movement of the latter and are transferred to the discharging belt. After the transfer of the products, the belt nose is retracted counter to the conveying direction in order to be able to receive a next product group and to be able to transfer it to the discharging belt by renewed advance of the belt nose.

As a result of the described combination of the two movement sequences, it is possible, on the one hand, to simply push the products fed to the transfer region onto the discharging belt by the products sliding or shooting out over the belt nose as a result of their inertia and thus being placed on the downstream discharging belt.

In another variant of the product transfer, the belt nose which is preferably arranged above the discharging belt is retracted at a speed counter to the conveying speed of the intermediate storage belt so that the products are deposited on the discharging belt. This type of product transfer is suitable in particular for sensitive products which have to be treated gently.

The translational or linear displacement of the intermediate storage belt as a whole, that is to say as a larger assembly group mentioned above, can furthermore also be used to implement an alignment function for the products. As soon as a product group or product row lies completely on the discharging belt, the horizontally movable intermediate storage belt can, for this purpose, be moved forward in the conveying direction in the direction towards the products, as a result of which the product group or product row which is already located on the discharging belt is then aligned with the belt nose of the intermediate storage belt. Subsequently, the belt nose or the entire intermediate storage belt, respectively, is retracted again counter to the conveying direction.

The above-described translational or linear displacement of the intermediate storage belt as a whole as a larger assembly group, that is to say, for example, the actual conveyor belt including the carrier or holding devices and the drive and guide means for the conveyor belt, such as, for example, the drive motor, components for open-loop and/or closed-loop control, deflection rollers and/or guide surfaces for the conveyor belt, which, furthermore, can all be accommodated together in a housing or carrier frame, has the disadvantage that, in this case, a large mass or a large weight and a large constructional volume which is caused by the plurality of components has to be moved to and fro continuously. This causes a high energy requirement for the drive of the translational, linear movement and furthermore leads to increased wear. Furthermore, on account of this movement, the lines and cables, which supply the belt drive motor and possibly other components with electrical energy and which are led to the assembly group from the outside, are continuously moved and thus loaded, for which reason they are likewise subject to increased wear.

The invention is therefore based on the object of providing an improved belt conveyor device or an improved intermediate storage belt, respectively, for lumpy products and an improved device for discharging products from a product stream, which uses a corresponding belt conveyor device or a corresponding intermediate storage belt, respectively, and a corresponding improved method. In this case, the above-described disadvantages are intended to be overcome and, in particular, it is intended to be brought about that the combination of the two movement sequences of the intermediate storage belt, namely, on the one hand, the movement of the conveyor belt or band as such and, on the other hand, the translational or linear displacement of the intermediate storage belt or of individual components thereof in order to advance the belt nose toward the discharge belt, is made more efficient, in that, in particular, the energy requirement for the drive of the translational, linear movement and, at the same time, wear of the concerned components of the intermediate storage belt is reduced. Furthermore, a reduction in the moved mass is intended to make possible a more dynamic movement and higher accelerations with, at the same time, lower drive powers or with smaller drives, respectively.

According to the invention, this object is achieved by a belt conveyor device for lumpy products according to claim 1 and by a product discharging device for discharging lumpy products from a product stream according to claim 13 and by a corresponding product discharging method according to claim 15.

The invention therefore provides a belt conveyor device for lumpy products, on which the products are conveyed in a substantially horizontal conveying direction from a first position, in which the products are received on the belt conveyor device, into a second position, in which the products are discharged from the belt conveyor device. The belt conveyor device according to the invention comprises the following features: a) a carriage which is movable back and forth between a rear position in the conveying direction and a front position in the conveying direction, wherein the carriage has an upper side and a lower side; b) a stationary carrier device which is arranged below the substantially horizontal product conveying plane, wherein the carriage is movably mounted on the upper side of the carrier device; c) a conveyor belt which carries the products and which is designed and held on the carriage in such a way that it is movable relative to the carriage on the upper side of the carriage in the conveying direction or counter to the conveying direction or is stationary relative to the carriage when the carriage moves or when the carriage is stationary, so that the movement of the products from the first position into the second position is caused by the movement of the carriage or the movement of the conveyor belt or a combination of these movements; d) wherein at least one section of the conveyor belt is guided in the conveying direction and/or counter to the conveying direction around the carriage substantially below the lower side of the carriage and is held on the carrier device.

The belt conveyor device according to the invention can be used as an intermediate storage belt or waiting belt or buffer belt, which is arranged for product conveying and transfer between an input-side product feeding belt or main belt and an output-side discharging belt or removal belt, as has been described in the introduction.

An essential aspect of the belt conveyor device according to the invention is therefore that a stationary, i.e. spatially fixed, carrier device is provided to which at least a section or part of a conveyor belt, which carries the products, is attached or held or fastened. The carrier device as such accordingly does not take part in the above-described translational or linear displacement of an intermediate storage belt or individual components thereof, which is necessary for an advance of a front edge or belt nose of the intermediate storage belt to a downstream discharging belt so that the products can be transferred from the intermediate storage belt to the discharging belt. The carrier device is typically formed by a suitable frame and/or substructure and/or housing.

According to the invention, it is furthermore provided that a carriage which can be moved back and forth is mounted on the upper side of the stationary carrier device. The conveyor belt as such moves on the upper side of the carriage in the conveying direction or counter to the conveying direction relative to the carriage or stands still relative to the carriage while the carriage moves forwards or backwards or stands still. Due to the movement of the carriage or the movement of the conveyor belt or a combination of these two movements with one another, the products are caused to move from a first position, in which they are received coming from the main belt on the intermediate storage conveyor belt, into a second position, in which they are transferred from the intermediate storage conveyor belt to the downstream discharging belt.

According to the invention, therefore, only the carriage carrying the conveyor belt moves, but not the stationary or fixed carrier device arranged there-below on or in which in particular a drive motor and guide and deflection means for the conveyor belt as well as a drive motor for the translational linear movement of the carriage and associated control and/or regulating devices and/or other peripheral components are accommodated. In other words, according to the invention, therefore, not the entire intermediate storage belt device is moved with all or a large part of its drive and peripheral devices. This results in the advantage that, in order to accomplish the required product conveying and transfer, a plurality of components with a correspondingly large mass and a correspondingly large constructional volume do not have to be continuously moved back and forth. As a result, a reduced drive power is possible or an energy requirement for the drive of the said movements is reduced, respectively. Furthermore, wear is reduced in that it is avoided that, for example, current cables, which supply the belt drive motor and/or the drive motor for the linear movement of the carriage and/or possibly other components with electrical energy, are continuously moved.

According to an advantageous embodiment of the belt conveying device according to the invention, the carriage has a front end in the conveying direction, around which the conveyor belt is guided, in particular a belt nose or a so-called blade edge, and/or a rear end in the conveying direction, around which the conveyor belt is guided. Here, the front end and/or the rear end of the carriage can have a deflection roller for the conveyor belt. The conveyor belt extends in particular from the front end and/or the rear end of the carriage substantially downwards, i.e. into the region of the underside of the carriage, and towards the carrier device carrying the carriage, at which it is attached or held in a suitable manner.

In a first variant, the conveyor belt is not closed in a circular manner but rather has two open ends, namely a front or first end assigned to the front end of the carriage and/or a rear or second end assigned to the rear end of the carriage. Here, the first end and/or the second end of the conveyor belt is fastened to the stationary carrier device. The respective end or both ends of the conveyor belt, respectively, are therefore fixed to the carrier device and do not move as such. Nevertheless, the conveyor belt as such can move along the upper side of the carriage, i.e. relative to the carriage, if the latter moves back and forth, as described above.

In a second variant, the conveyor belt is an endless belt which is substantially closed in a circular manner and which is driven by a belt drive device which is mounted on the stationary carrier device. The belt drive device as such is therefore likewise stationary, i.e. stands substantially fixed in space. Therein, the conveyor belt is guided, for example, around the belt drive device and/or the belt drive device engages such with the conveyor belt and holds the conveyor belt and/or drives it in such a manner that the conveyor belt moves on the upper side of the carriage relative to the carriage or stands still relative to the carriage, i.e. is moved synchronously with the carriage, while the carriage moves or stands still. In this case, both the conveyor belt (in relation to the upper side of the carriage) and the carriage can move both forwards and backwards, that is to say in the conveying direction or counter to the conveying direction, or they can stand still.

In a sub-form of this second variant, the belt drive device stands still and does not drive the conveyor belt while the carriage moves from its rear position into its front position or vice versa. As a result, the conveyor belt as such moves along the upper side of the carriage relative to the carriage. This embodiment corresponds in principle to the above-mentioned first variant in which the two open ends of the conveyor belt are fastened to the stationary carrier device and as such do not move.

In the two above-mentioned embodiments in which the conveyor belt is fixed or held fixed on the carrier device either by being fastened with its two open ends to the carrier device or by the belt drive device mounted on the carrier device standing still and not driving the conveyor belt, the carriage and the conveyor belt can preferably be designed and arranged and interact in such a way that the distance over which the products are conveyed by the conveyor belt in the conveying direction while the carriage moves from its rear position into its front position is substantially an integer multiple of the distance over which the carriage moves from its rear position into its front position.

In a preferred embodiment, it can be provided here that the distance over which the products are conveyed by the conveyor belt in the conveying direction while the carriage moves from its rear position into its front position is substantially twice the distance over which the carriage moves from its rear position into its front position.

In this way, the products are conveyed on the belt conveying device according to the invention solely by the forward movement of the carriage and are discharged from the belt conveying device at its front end in the conveying direction. The conveyor belt as such is not driven here and, in this respect, does not contribute to the product conveying and discharging. In this respect, in principle a belt drive can be dispensed with or a product conveying is possible, respectively, even though the belt drive stands still.

These embodiments are based substantially on the physical principle of a pulley, wherein the parts of the conveyor belt running around the carriage, i.e. the affected sections of the conveyor belt running substantially parallel to one another on the upper side and the lower side of the carriage, correspond to the individual or a plurality of legs of a pulley arrangement running parallel to one another, as is explained further below in connection with the drawings.

The attachment of the belt drive device to the stationary carrier device has the advantage that it itself is likewise mounted stationary, fixed and therefore does not have to be continuously moved back and forth with other components of an intermediate storage belt, in particular the carriage of the belt conveying device according to the invention, as has been described above. This embodiment therefore contributes to the advantages achieved according to the invention of an energy saving and a reduction of wear.

In a further embodiment of the belt conveying device according to the invention, it is provided that the belt drive device mounted on the carrier device drives the conveyor belt counter to the conveying direction, that is to say so to speak backwards, while the carriage moves from its rear position into its front position, so that the conveyor belt does not move on the upper side of the carriage relative to the carriage. This causes the product to stand substantially at a fixed position in relation to the carriage when the carriage moves forwards, in particular in the region of the front end of the carriage, i.e. the product is moved in the conveying direction substantially at the speed of the carriage movement. The belt drive device thus compensates so to speak for the movement of the conveyor belt or conveyor band relative to the carriage that arises during the forward movement of the carriage.

Overall, the belt conveying device according to the invention and in particular the displaceable carriage or the displaceable front belt nose or blade edge of the carriage, respectively, is based on the principle of a pull-nose device. However, according to the invention, the forward and backward movement of the blade edge is not compensated for by the geometric construction, but rather the resulting conveyor belt movement is used.

In addition to the belt drive device described above, a carriage drive device for the carriage can also be mounted on the stationary carrier device. The carriage drive device as such is therefore likewise stationary, i.e. stands substantially fixed in space. Herein, the carriage drive device is designed to move the carriage linearly or translationally back and forth between its rear position in the conveying direction and its front position in the conveying direction. The carriage drive device is therefore also referred to as linear drive. The attachment of the carriage drive device to the carrier device has the advantage that it itself is likewise mounted stationary, fixed and therefore does not have to be continuously moved back and forth with other components of an intermediate storage belt, in particular the carriage of the belt conveying device according to the invention, as has been described above. This embodiment therefore likewise contributes to the advantages achieved according to the invention of an energy saving and a reduction of wear.

The belt conveying device according to the invention can furthermore provide that a track edge regulating device is attached to the stationary carrier device, wherein the track edge regulating device is designed to regulate and/or control a correct course and/or a correct arrangement and alignment of the conveyor belt during its movement in the conveying direction. Herein, the track edge regulating device preferably comprises the following features: a) at least one deflection roller for the conveyor belt which has an adjustable axis which is aligned substantially parallel to the horizontal product conveying plane and perpendicular to the horizontal conveying direction; b) at least one sensor which determines a respective current alignment of the conveyor belt during its movement in or counter to the conveying direction; and c) a drive device which is designed to align the axis of the deflection roller on the basis of the current alignment of the conveyor belt respectively determined by the sensor such that the conveyor belt has a substantially straight and/or centered alignment in the conveying direction during its movement.

The sensor detects in particular a deflecting of the conveyor belt to the right or to the left in the conveying direction or a run-out of the conveyor belt from the conveying direction, respectively. The track edge regulation therefore ensures that the conveyor belt or the conveyor band always runs centrally and cannot run away to one side. According to the invention, in particular an active regulation is implemented. This means that the conveyor belt edge is monitored at all times with a sensor. If this edge runs out of a predetermined target range, a deflection roller for the conveyor belt is actively adjusted with a drive device, in particular a motor. By means of this adjustment, in particular an inclined positioning, of this deflection roller, the conveyor belt is therefore again centered in the central position.

The attachment of the drive device for the track edge regulation device to the carrier device in turn has the advantage that this drive device as such is also mounted stationary, fixedly and therefore does not have to be continuously moved back and forth with other components of an intermediate storage belt, in particular the carriage of the belt conveying device according to the invention, as has been described above. This embodiment therefore likewise contributes to the advantages achieved according to the invention of an energy saving and a reduction of wear.

The various drive devices described above, namely the belt drive device and/or the carriage drive device and/or the drive device of the track edge regulation device, preferably each have a suitable electric motor, in particular a servo motor. On account of the usual weight of such motors, it is advantageous for the reasons mentioned above that these motors are attached stationary, fixedly to the carrier device and as such do not have to be moved.

Furthermore, further deflection rollers for the conveyor belt and/or further peripheral or additional components for the drives and the actuation and regulation thereof are attached to the stationary carrier device. All these components are therefore likewise arranged stationary, fixedly and as such do not move in space. Since the weight of these components therefore does not have to be moved back and forth, this also contributes to the above-described advantages of an energy saving and a reduction of wear as achieved according to the invention.

In a further advantageous embodiment of the belt conveying device according to the invention, it is provided that the front end of the carriage, around which the conveyor belt is guided, that is to say the belt nose or the so-called blade edge, forms a rounded edge which has a diameter of preferably approximately 7 to 12 mm. The blade edge can optionally have a deflection roller or the like, that is to say the blade edge can be embodied both rolling and standing, that is to say with or without a deflection roller or with a fixed deflection roller. It is thereby achieved that the belt nose comes to lie relatively flat on the downstream discharging belt and that the products can therefore be transferred to the discharging belt without them having to overcome a significant step or edge. The products are thereby treated particularly gently.

According to the invention, a product discharging device for discharging lumpy products from a product flow is furthermore provided, which comprises the following features: a) a product feeding belt or main belt on which the products are fed in a substantially horizontal main conveying direction; b) an intermediate storage belt or waiting belt or buffer belt which is arranged in the main conveying direction substantially behind and/or below the product feeding belt and which receives the products from the product feeding belt and conveys them further substantially in the main conveying direction; c) a discharging belt or removal belt which is arranged in the main conveying direction substantially behind and/or below the intermediate storage belt and which receives the products from the intermediate storage belt and conveys them further in a direction substantially transversely or perpendicularly to the main conveying direction. Herein, the intermediate storage belt is formed in particular by a belt conveying device according to the invention, as it has been described above.

The product discharging device mentioned above can be configured in particular such that the intermediate storage belt or the discharging belt in each case alone or an assembly group formed jointly by the intermediate storage belt and the discharging belt can be pulled out of the entire product discharging device transversely or perpendicularly to the main conveying direction and counter to the conveying direction of the discharging belt. This serves in particular for an easy accessibility of the plant components for purposes of servicing, maintenance and cleaning. A rapid, tool-free change of the conveyor belt can also be made possible thereby.

Furthermore, the invention also provides a product discharging method for discharging lumpy products from a product stream. Herein, this method is carried out in particular by the above-mentioned product discharging device, which in turn comprises the above-described belt conveying device according to the invention as an intermediate storage belt.

Further details and advantages of the invention result from the following detailed description of exemplary embodiments of the invention with reference to the enclosed drawings.

Figure 1:
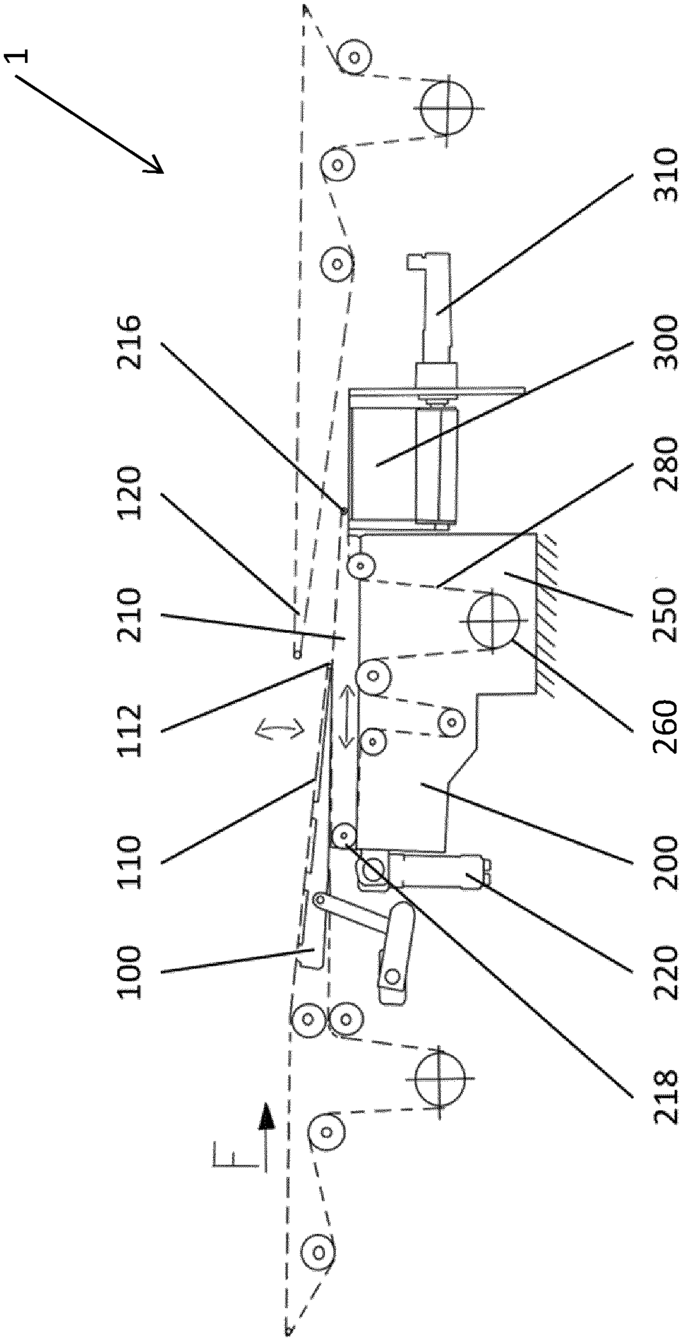
FIG. 1 shows a product discharging device according to the invention with a first embodiment of a belt conveying device according to the invention in a first position.

FIGS. 7*a* to 7*d* show a possible sequence of the working steps of the belt conveying device according to the invention in the second embodiment.

FIGS. 8*a* to 8*f* show a possible sequence of the working steps of the belt conveying device according to the invention in the first embodiment.

FIGS. 1 to 4 show a product discharging device or product removal device 1 which substantially consists of a product feeding belt or main belt 100, a discharging belt or removal belt 300 and an intermediate storage belt or waiting belt or buffer belt 200. As has been described in the introduction, the products are fed on the product feeding belt 100 in a main conveying direction F, i.e. in the drawings from left to right. Therein, the products can generally be conveyed in any arrangements and/or orientations, that is, e.g., as individual products following one another, as product rows extending transversely or obliquely to the conveying direction F, in which e.g. one product lies next to the other, or as product groups in which a plurality of products lie one behind the other and next to one another with or without spacing.

The main belt 100 can be configured in the form of a diverter in order to branch off or discharge products from the main product stream. For this purpose, the main belt 100 is formed e.g. from two successive partial belts 110, 120 arranged in principle one behind the other without gaps. Herein, the first, i.e. arranged upstream, partial belt 110 in the conveying direction F is designed as a switch belt with a front, i.e. arranged downstream, pivotable, in particular lowerable belt nose or belt edge 112. For discharging the products from the main product stream, the belt nose 112 is lowered onto a downstream conveyor belt lying somewhat lower so that the products are transferred to this lower lying belt instead of to the second partial belt 120. Subsequently, the belt nose 112 is pivoted upward again so that the downstream products are then not discharged but transferred to the second partial belt 120 in order to be further conveyed on the main belt 100 in the main conveying direction F.

The mentioned lower lying conveyor belt is here the intermediate storage belt or waiting belt or buffer belt 200, the function of which is described in more detail below. On the intermediate storage belt 200, the discharged products transferred from the first partial belt 110 of the main belt 100 are conveyed further substantially in the main conveying direction F and then transferred to the following discharging belt or removal belt 300. The intermediate storage belt 200 serves here as a buffer place for the products discharged from the main product stream before they are transferred to the removal belt 300. On this removal belt 300, the products are conveyed further transversely to the main conveying direction F, i.e. in the drawings into the drawing plane. For this purpose, the removal belt 300 typically comprises a drive motor 310. The removal belt 300 can therefore also be referred to as transverse removal belt. From the removal belt 300, the products are finally transferred to a downstream packaging machine (not shown in the drawings) or another device for further processing.

Figure 2:
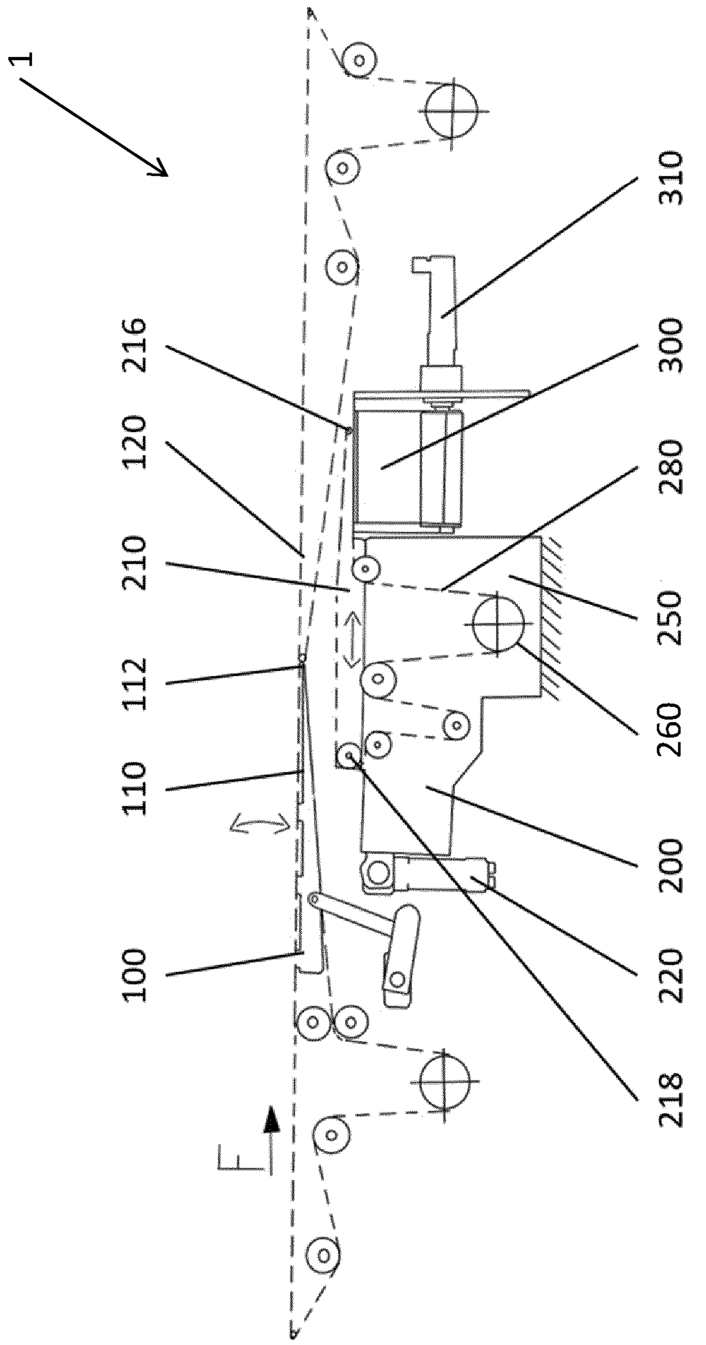
FIG. 2 shows the product discharging device from FIG. 1 with the belt conveying device in a second position.
Figure 5:
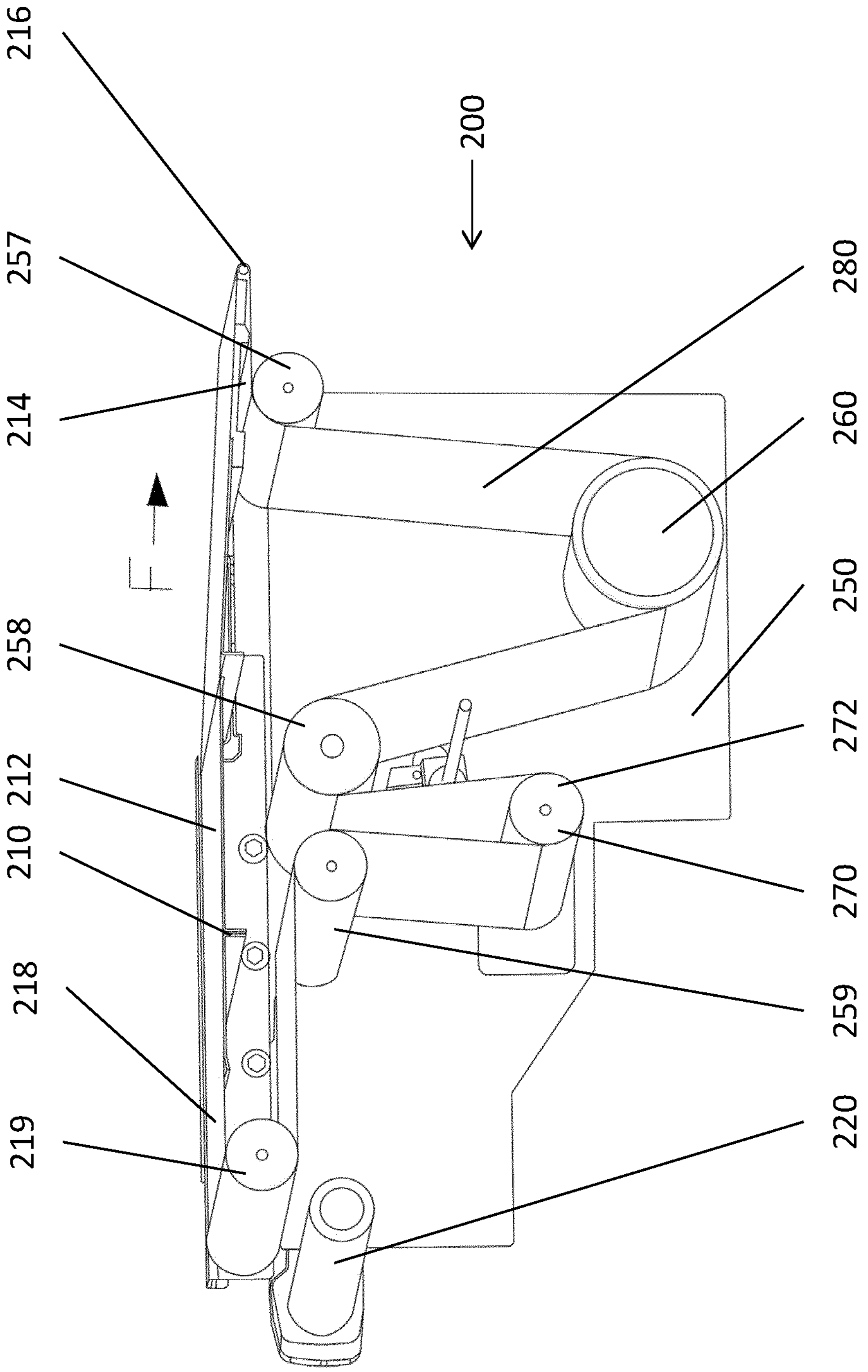
FIG. 5 shows the first embodiment of the belt conveying device according to the invention in a first position.
Figure 6:
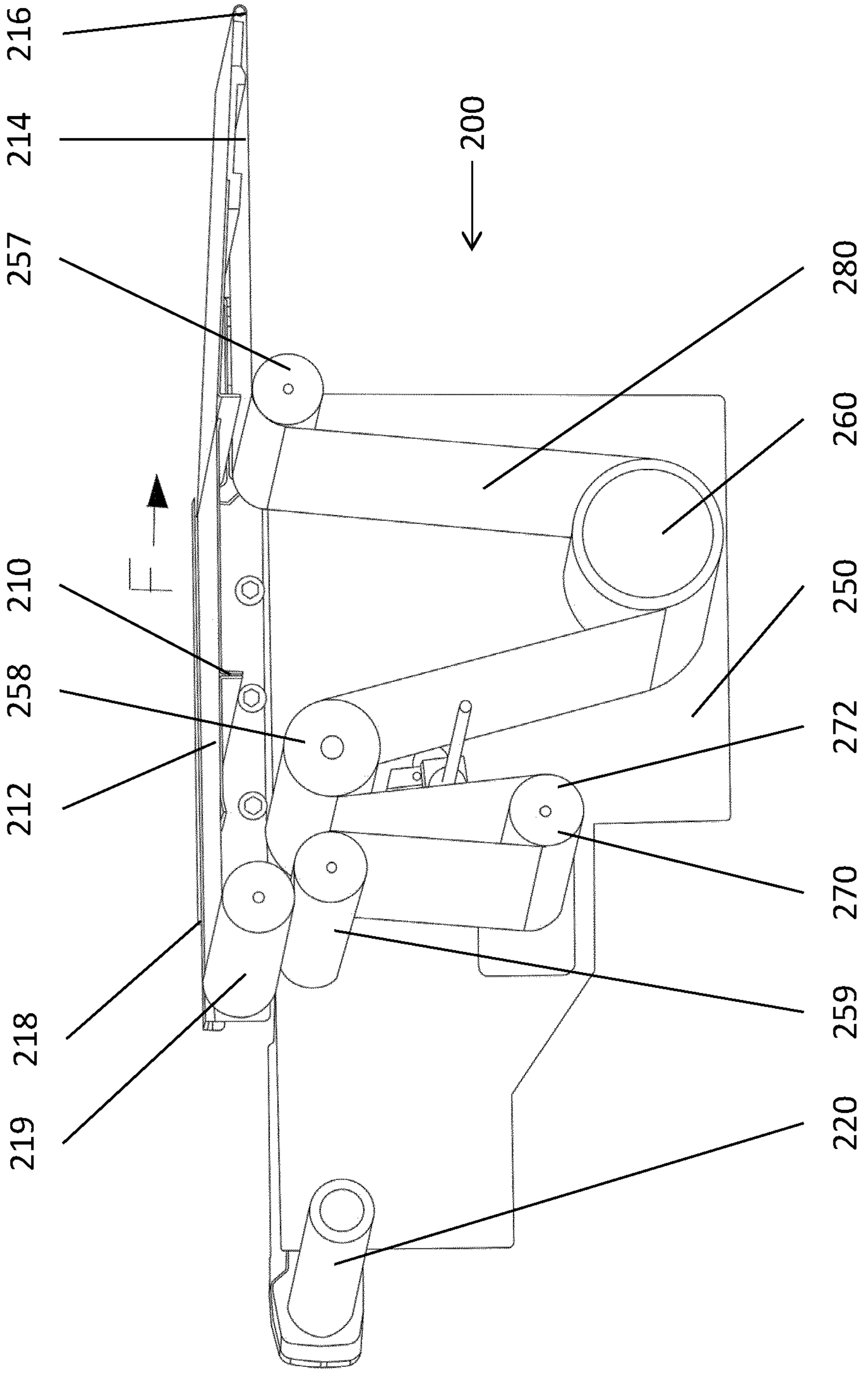
FIG. 6 shows the belt conveying device from FIG. 5 in a second position.

The belt conveying device 200 forming the intermediate storage belt or waiting belt or buffer belt is shown in a first embodiment in two different positions in FIGS. 1 and 2 and in more detail in FIGS. 5 and 6. The position shown in FIG. 1 corresponds to the position shown in FIG. 5. The position shown in FIG. 2 corresponds to the position shown in FIG. 6.

The intermediate storage belt 200 comprises in particular a carriage 210, which has an upper side 212 and an underside 214 as well as a front end 216 and a rear end 218 as seen in the conveying direction F. The carriage 210 can be moved to and fro, i.e. back and forth, between a rear position in the conveying direction F (FIGS. 1 and 5) and a front position in the conveying direction F (FIGS. 2 and 6). The intermediate storage belt 200 furthermore comprises a stationary carrier device 250, which is fixed in space, below the carriage 210. The carrier device 250 can comprise a frame and/or a housing and/or another suitable substructure. The carriage 210 is mounted on the upper side of the carrier device 250 such that it can be moved back and forth. For a corresponding translational, linear displacement of the carriage 210, the carriage 210 and the carrier device 250 comprise suitable cooperating guide means, in particular guide rails and/or guide surfaces. In order to bring about the translational displacement of the carriage 210, a carriage drive device 220, in particular a linear motor or a linear unit, is mounted on the carrier device 250 and coupled in a suitable manner to the carriage 210.

The belt conveying device 200 forming the intermediate storage belt furthermore comprises a conveyor belt 280, which carries the products. The conveyor belt 280 is configured and held on the carriage 210 or runs around the carriage 210, respectively, in such a manner that it can be moved on the upper side 212 of the carriage 210 in the conveying direction or counter to the conveying direction relative to the carriage 210 or stands still relative to the carriage 210, namely both while the carriage 210 moves and when the carriage 210 stands still. The conveying of the products on the intermediate storage belt 200 overall can thus be brought about either by the movement of the carriage 210 alone or by the movement of the conveyor belt 280 alone or by a combination of the movements of the carriage 210 and the conveyor belt 280. In order to accomplish the movement of the conveyor belt 280 as such, a belt drive device 260 or a belt drive motor or so-called drum motor, respectively, is mounted on the carrier device 250. The belt drive device 260 is coupled in a suitable manner to the conveyor belt 280 or engages therein, respectively.

The conveyor belt 280 shown in FIGS. 1, 2, 5 and 6 is a circulating endless belt which runs around the carriage 210, in particular around the front end 216 and the rear end 218 of the carriage 210, as well as around the belt drive device 260. Therein, one or more deflection rollers 219, 257, 258, 259 are provided in the movement path of the conveyor belt 280 for controlling and guiding the conveyor belt 280. Thus, in particular a deflection roller 219 is attached to the rear end 218 of the carriage 210. Further deflection rollers 257, 258, 259 are mounted on the carrier device 250.

Furthermore, a track edge regulating device 270 can be attached to the carrier device 250 in order to regulate and/or control a correct course and/or a correct arrangement and alignment of the conveyor belt 280 during its movement. Herein, the track edge regulating device 270 comprises at least one deflection roller 272 for the conveyor belt 280 which has an adjustable axis which is aligned substantially parallel to the horizontal product conveying plane and perpendicular to the horizontal conveying direction F. The track edge regulating device 270 furthermore comprises a sensor (not shown in the drawings) which determines a respective current alignment of the conveyor belt during its movement, and a drive device (likewise not shown in the drawings), in particular a (servo) motor, which aligns the axis of the deflection roller 272 on the basis of the current alignment of the conveyor belt 280 respectively determined by the sensor such that the conveyor belt 280 has a substantially straight and/or centered alignment in the conveying direction during its movement.

It results from the above that a section or part of the conveyor belt 280 extends on the upper side 212 of the carriage 210, while another section or part of the conveyor belt 280 extends substantially at the underside 214 of the carriage 210 or below the carriage 210 in the region of the carrier device 250. In this case, this lower section of the conveyor belt 280 is held on the carrier device 250, namely, on the one hand, by the deflection rollers 257, 258, 259, 272 and, on the other hand, in particular by the belt drive device 260.

An essential aspect of the described belt conveying device or of the intermediate storage belt 200, respectively, is therefore that the lower section of the conveyor belt 280 is attached in particular by means of the belt drive device 260 to the stationary carrier device 250 and is therewith fixed in space. In this case, it is furthermore essential that, for the basic conveying of the products by means of the belt conveying device 200, the belt drive device 260 can either move or stand still.

By contrast, the upper section of the conveyor belt 280 arranged on the upper side 212 of the carriage 210 can move along the upper side 212 of the carriage 210 relative to the carriage 210, namely, on the one hand, caused and driven by the movement of the belt drive device 260, both when the carriage 210 moves forwards or backwards and when the carriage 210 stands still. On the other hand, the upper section of the conveyor belt 280 can also move along the upper side 212 of the carriage 210 relative to the carriage 210 when the belt drive device 260 does not move, i.e. stands still as such, in this case therefore caused solely by the forwards or backwards movement of the carriage 210.

In a further alternative, the upper section of the conveyor belt 280 does not move along the upper side 212 of the carriage 210 relative to the carriage 210, while the carriage 210 moves forwards or backwards. In this case, the movement of the carriage 210 is compensated for or equalized by a suitable, in particular opposite movement of the belt drive device 260.

Overall, it is therefore achieved by the movement of the carriage 210 or the movement of the conveyor belt 280 or a suitable combination of these two movements with one another, both in the forwards and in the backwards direction, that the products move from a first position, in which they are received, coming from the main belt 100, on the conveyor belt 280 of the intermediate storage belt 200, into a second position, in which they are transferred from the conveyor belt 280 of the intermediate storage belt 200 to the downstream discharging belt 300.

Figure 3:
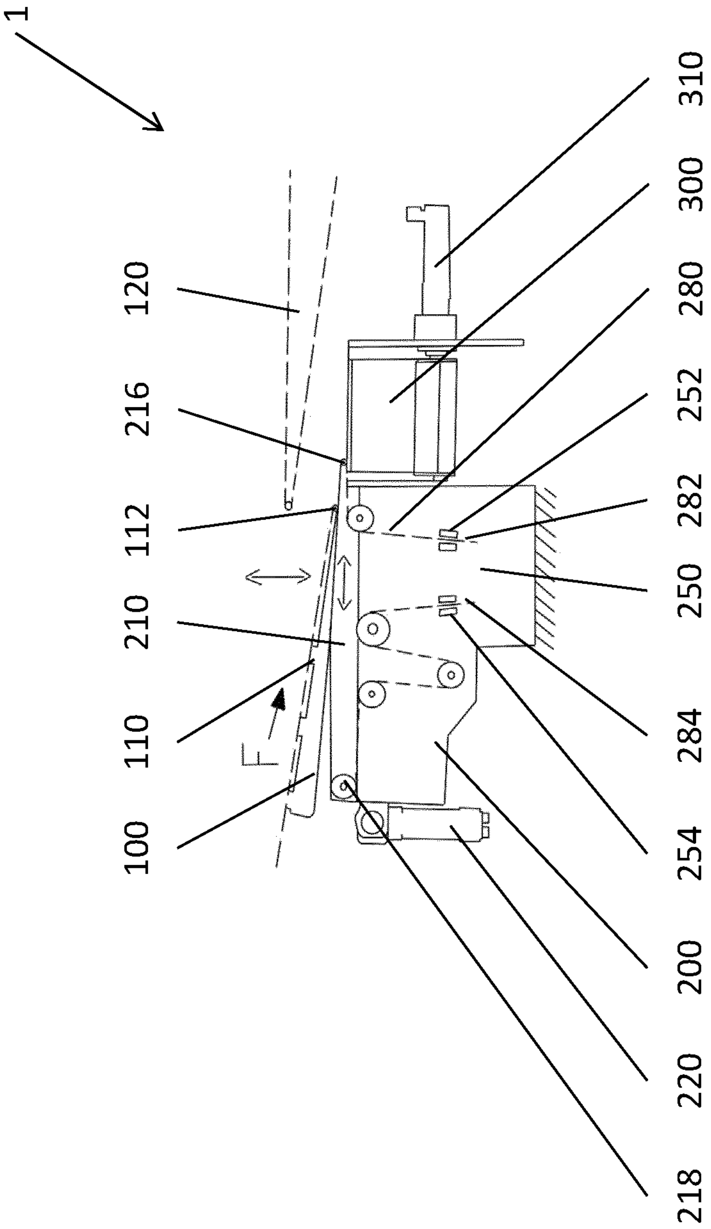
FIG. 3 shows a product discharging device according to the invention with a second embodiment of a belt conveying device according to the invention in a first position.
Figure 4:
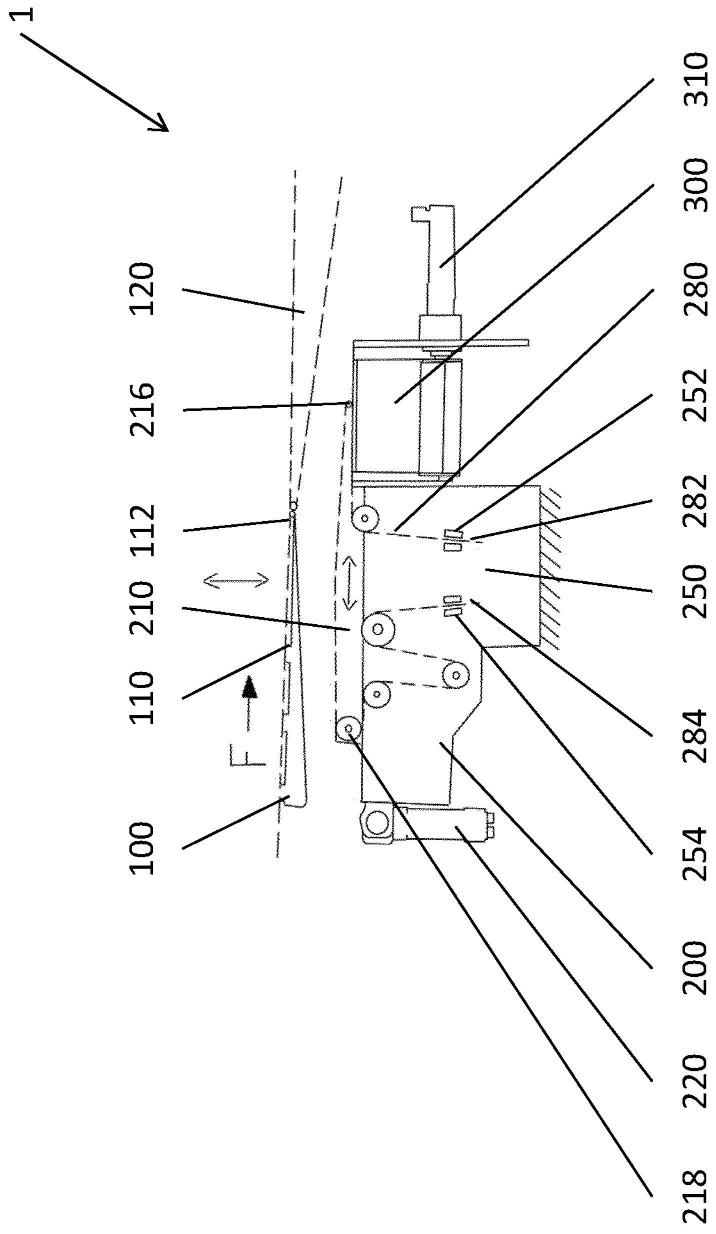
FIG. 4 shows the product discharging device from FIG. 3 with the belt conveying device in a second position.

The variant of the first embodiment of the product conveying described above with reference to FIGS. 1, 2, 5 and 6, in which the conveyor belt 280 is fixed at the carrier device 250 in that the belt drive device 260 stands still and therefore does not actively drive the conveyor belt 280, i.e. in which the product conveying takes place solely by the forwards or backwards movement of the carriage 210, corresponds to a second embodiment of the belt conveying device or of the intermediate storage belt 200, respectively, which is shown in FIGS. 3 and 4. In this case, all essential components initially correspond to those of the first embodiment, so that in this respect reference is made to the above description. As an essential difference of the second embodiment with respect to the above-mentioned variant of the first embodiment, however, the conveyor belt 280 is not an endless belt closed in a circular manner but rather has two open ends, namely a front or first end 282 assigned to the front end 216 of the carriage 210 and/or a rear or second end 284 assigned to the rear end 218 of the carriage 210. Herein, the first end 282 and/or the second end 284 of the conveyor belt 280 are fastened to the stationary carrier device 250 by means of suitable clamping or fastening devices 252, 254. The two ends 282, 284 of the conveyor belt 280 are thus fixed to the stationary carrier device 250 and as such cannot move in space. In particular, no belt drive device is provided for driving and for the active movement of the conveyor belt 280. As in the above-described first embodiment, in which the belt drive device 260 stands still, also in this second embodiment, the conveyor belt 250 as such moves so to speak passively along the upper side of the carriage 210, i.e. relative to the carriage 210, if the latter moves back and forth.

As can be seen from the arrangements shown in FIGS. 1 to 4 and in particular in FIGS. 5 and 6, in the two above-mentioned embodiments in which the conveyor belt 280 is held fixed on the stationary carrier device 250 either by being fastened with its two open ends 282, 284 to the carrier device 250 or by the belt drive device 260 mounted on the carrier device 250 standing still and not driving the conveyor belt 280, the distance over which the products are conveyed by the conveyor belt 280 in the conveying direction while the carriage 210 moves from its rear position (cf. FIG. 5) into its front position (cf. FIG. 6) is substantially twice the distance over which the carriage 210 moves from its rear position into its front position. This fact is based substantially on the physical principle of a pulley.

As can be seen from FIGS. 5 and 6, the distance over which the carriage 210 moves from its rear position into its front position corresponds approximately to the distance between the two deflection rollers 219 and 259 in the conveying direction. Over this distance, the conveyor belt 280 extends so to speak in two layers or in two legs, namely with a first section on the upper side 212 of the carriage 210 and, parallel thereto, with a second section on the underside 214 of the carriage 210. When the carriage 210 moves over this distance from its rear position into its front position, the first, upper and the second, lower section of the conveyor belt 280 are consequently so to speak dissolved or compensated for. Since the conveyor belt 280 as such is fixed to the still-standing belt drive device 260 (FIGS. 1, 2, 5 and 6) or to the clamping or fastening devices 252, 254 (FIGS. 3 and 4), respectively, the conveyor belt 280 thus moves as such on the upper side of the carriage 210 during the movement of the carriage 210 over twice the distance over which the carriage 210 moves, i.e. approximately over twice the distance between the two deflection rollers 219 and 259 in the conveying direction.

The same applies according to the pulley principle when the conveyor belt 280 extends in multiple layers or in multiple legs over the distance over which the carriage 210 moves. The distance over which the products are conveyed by the conveyor belt 280 in the conveying direction while the carriage 210 moves from its rear position (cf. FIG. 5) into its front position (cf. FIG. 6) then corresponds substantially to an integer multiple of the distance over which the carriage moves, corresponding to the plurality of parallel legs of the conveyor belt 280.

On the basis of the above-described pulley principle, it is therefore an essential feature of the two above-mentioned embodiments, in which the conveyor belt 280 is held or fixed on the stationary carrier device 250 and itself is not actively driven, that the product conveying is accomplished solely by the forwards or backwards movement of the carriage 210 and the relative movement of the conveyor belt 280 caused thereby. This is explained below still in more detail with reference to FIGS. 7*a* to 7*d* and FIGS. 8*a* to 8*f*.

FIGS. 7*a* to 7*d* show a possible sequence of the working steps of the belt conveying device or of the intermediate storage belt 200 in the above-described second embodiment, in which the conveyor belt 280 is held on the stationary carrier device 250, in that it is fixed with its two open ends 282, 284 on the carrier device 250 (cf. FIGS. 3 and 4). The product blocks P shown schematically in FIGS. 7*a* to 7*d* can be individual products or single-row or multi-row product groups.

Figure 7A:
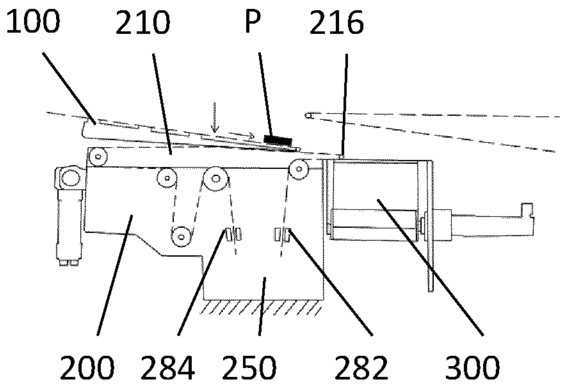
Figure 7B:
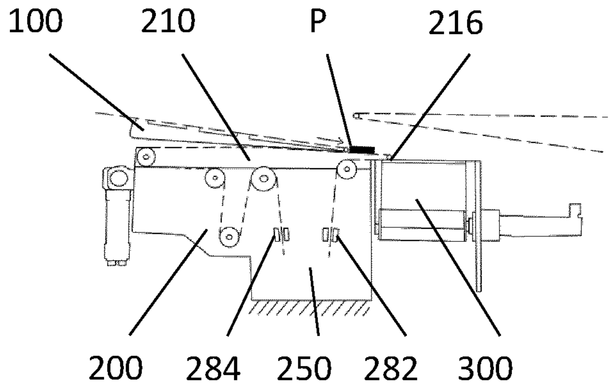
Figure 7C:
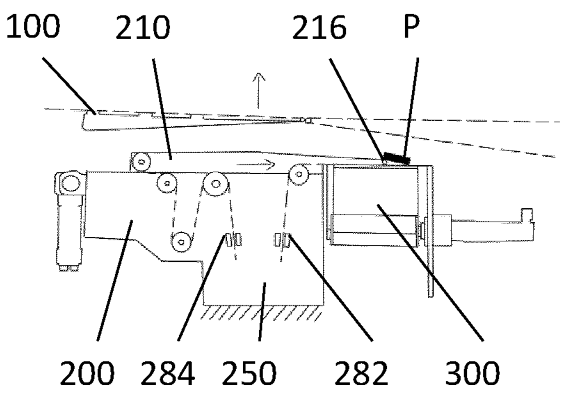
Figure 7D:
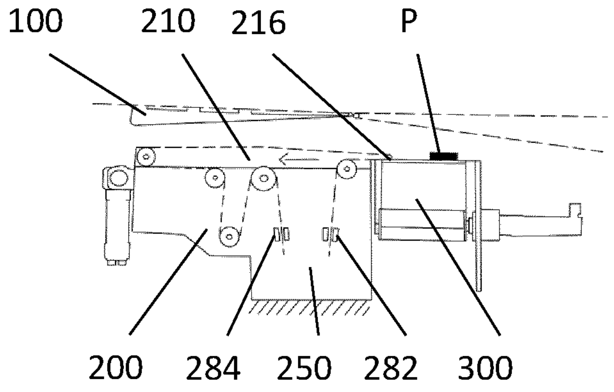

FIGS. 7*a* and 7*b* show the selection of a product block P for the removal station formed from intermediate storage belt 200 and transverse removal belt 300. The products P are thereby transferred from the main belt 100 pivoted downward to the conveyor belt 280 or the carriage 210 of the intermediate storage belt 200, respectively. Herein, the carriage 210 is located in its rear, retracted position. With the subsequent forward movement of the carriage 210 (FIG. 7*c*), the belt nose 216 is pushed over the transverse removal belt 300, namely in particular into a position in which the product P can be positioned correctly, for example centered, on the transverse removal belt 300. On account of and during this forward movement of the carriage 210, the product P moves forward, on account of the pulley principle described above, over a distance on the carriage 210 that is substantially twice the distance over which the carriage 210 moves from its rear position into its front position. The product P is thereby pushed down forward by the conveyor belt 280 of the carriage 210 as soon as it reaches the belt nose 216. As soon as the product P is positioned on the transverse removal belt 300, the carriage 210 is retracted into its starting position (FIG. 7*d*) in order to be able to receive products again from the main belt 100.

FIGS. 8*a* to 8*f* show a possible sequence of the working steps of the belt conveying device or of the intermediate storage belt 200 in the first embodiment described above, in which the conveyor belt 280 is held on the stationary carrier device 250 by means of the belt drive device 260, wherein the belt drive device 260 can either move or stand still (cf. FIGS. 1, 2, 5 and 6). The product blocks P shown schematically in FIGS. 8*a* to 8*f* can in turn be individual products or single-row or multi-row product groups.

Comparable to FIGS. 7*a* and 7*b*, FIGS. 8*a* and 8*b* show the selection of a product block P for the removal station formed from intermediate storage belt 200 and transverse removal belt 300. The products P are thereby transferred from the main belt 100 pivoted downward to the conveyor belt 280 or the carriage 210 of the intermediate storage belt 200, respectively. Herein, the carriage 210 is located in its rear, retracted position.

Figure 8A:
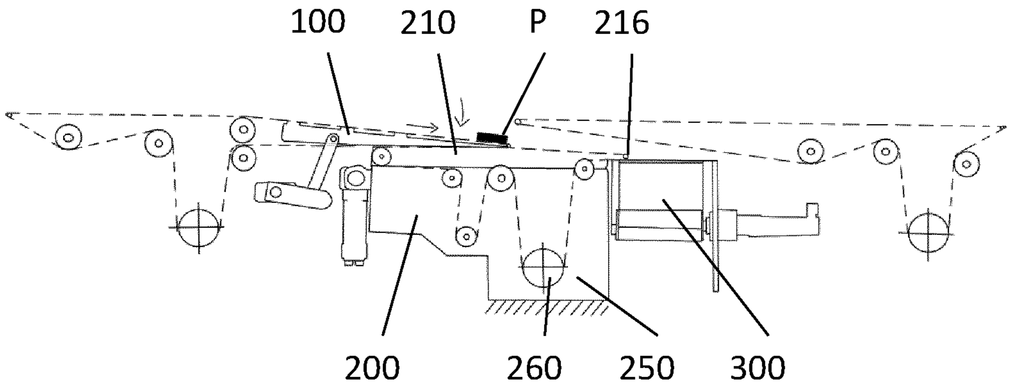
Figure 8B:
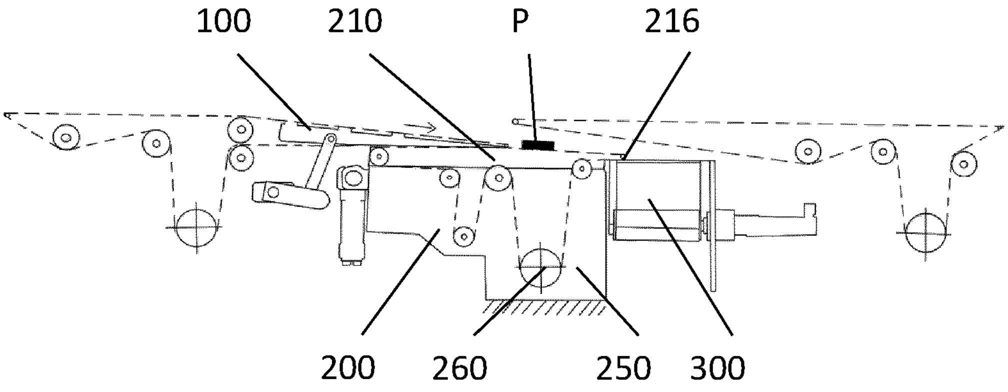
Figure 8C:
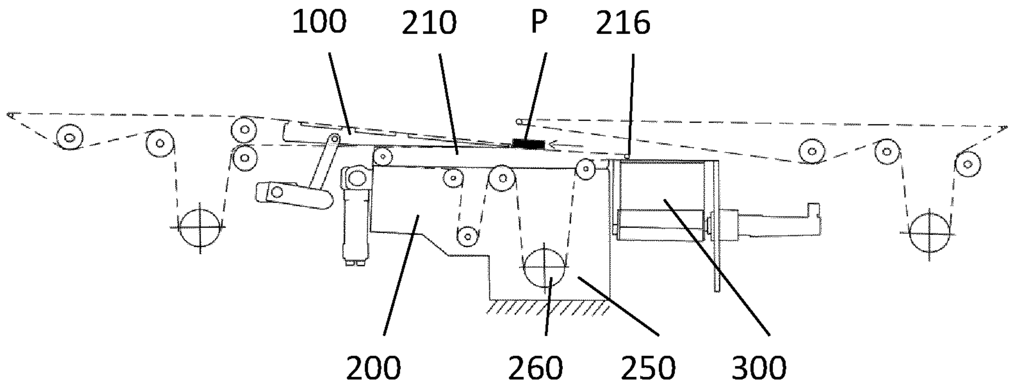
Figure 8D:
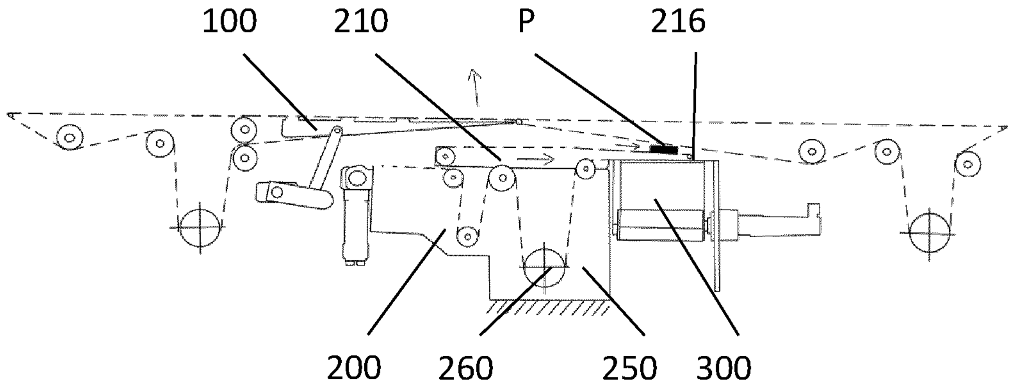
Figure 8E:
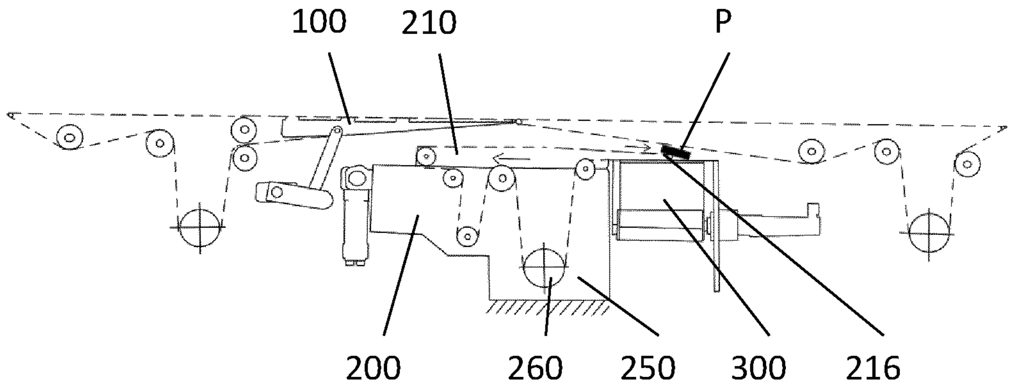

According to FIG. 8*c*, with single-row product blocks or product groups P, an alignment of the product row can optionally be possible. This alignment can be accomplished in that either the main belt 100 pivoted downward is still slightly moved forward in the conveying direction in a translatory manner and is pushed against the product row P already lying on the conveyor belt 280 of the carriage 210. Vice versa, it is also conceivable that the carriage 210 is moved backward, whereby the product row P is pushed backward against the main belt 100 which is still pivoted downward. (These two variants of the alignment are in principle also conceivable in the second embodiment described above in connection with FIGS. 7*a* and 7*b* without belt drive device 260). Alternatively, the product alignment according to FIG. 8*c* can be accomplished in that the conveyor belt 280 of the carriage 210 is briefly moved backward and thus the product row P lying on the conveyor belt 280 is pushed backward against the main belt 100 which is still pivoted downward. (This variant of the alignment is not possible in the second embodiment described above in connection with FIGS. 7*a* and 7*b*, since here the conveyor belt 280 cannot be moved as such in the absence of a belt drive device 260).

With the subsequent forward movement of the carriage 210 (FIG. 8*d*), the belt nose 216 is pushed over the transverse removal belt 300, namely in particular into a position in which the product P can be positioned correctly, for example centered, on the transverse removal belt 300. On account of and during this forward movement of the carriage 210, the product P moves forward, with the belt drive device 260 standing still, on account of the pulley principle described above, over a distance on the carriage 210 that is substantially twice the distance over which the carriage 210 moves from its rear position into its front position. Alternatively, the belt drive device 260 can drive the conveyor belt 280 and thereby move the products P forward. In both cases, the product P is pushed down forward from the conveyor belt 280 of the carriage 210 as soon as it reaches the belt nose 216. According to FIG. 8*e*, herein, the carriage 210 can also already be retracted again while the conveyor belt 280 moves the product P further forward and finally pushes it onto the transverse removal belt 300. For this purpose, the conveying speed of the conveyor belt 280 must be greater than the retraction speed of the carriage 210. In any case, at the latest when the product P is positioned on the transverse removal belt 300, the carriage 210 is retracted into its starting position (FIG. 8*f*) in order to be able to receive products again from the main belt 100.

Figure 8F:
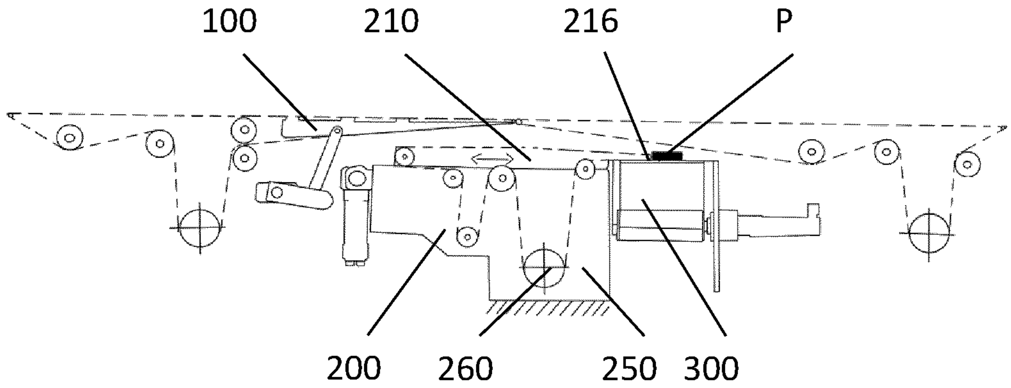

According to FIG. 8*f*, with single-row product blocks or product groups P, an alignment of the product row P can optionally also be possible on the transverse removal belt 300. For this purpose, the carriage 210 is translationally still slightly moved forward in the conveying direction with its belt nose 216 before the complete retraction and is pushed against the product row P which is already lying on the transverse removal belt 300. (This variant of the alignment is in principle also conceivable in the second embodiment described above in connection with FIGS. 7a to 7d since a belt drive device 260 is not required for this purpose).

It can be seen that it is possible in the embodiment described above in connection with FIGS. 8a to 8f that the belt drive device 260 drives the conveyor belt 280 counter to the conveying direction, i.e. so to speak backwards. This can be desirable in particular in a phase in which the carriage 210 moves forward. It can thereby be achieved, for example, that the conveyor belt 280 does not move on the upper side 212 of the carriage 210 relative to the carriage 210. This causes the product to stand substantially at a fixed position in relation to the carriage 210 when the carriage 210 moves forwards, in particular in the region of the front belt nose 216 of the carriage 210, i.e. the product is moved in the conveying direction substantially at the speed of the carriage movement. The belt drive device 260 running backwards thus compensates so to speak for the forward movement of the carriage 210.

LIST OF REFERENCE SIGNS

1 product discharging device, product removal device
P products, product blocks, product groups
F main conveying direction
100 product feeding belt, main belt
110 partial belt of the main belt
112 belt nose, belt edge, pivot nose
120 partial belt of the main belt
200 belt conveyor device, intermediate storage belt, waiting belt, buffer belt
210 carriage
212 upper side of the carriage
214 underside of the carriage
216 front end of the carriage, belt nose, blade edge
218 rear end of the carriage
219 deflection roller
220 carriage drive device, linear motor, linear unit
250 carrier device
252 fastening device
254 fastening device
257 deflection roller
258 deflection roller
259 deflection roller
260 belt drive device, belt drive motor, drum motor
270 track edge regulating device
272 deflection roller
280 conveyor belt, conveyor band
282 front, first end of the conveyor belt
284 rear, second end of the conveyor belt
300 discharging belt, removal belt, transverse removal belt
310 drive motor

What is claimed is:

1. A belt conveyor device for lumpy products, on which the products are conveyed in a substantially horizontal conveying direction from a first position, in which the products are received on the belt conveying device, into a second position, in which the products are discharged from the belt conveying device, the belt conveying device comprising:

a) a carriage which can be moved back and forth between a rear position in the conveying direction and a front position in the conveying direction, wherein the carriage has an upper side and an underside;

b) a stationary carrier device which is arranged below a substantially horizontal product conveying plane, wherein the carriage is movably mounted on an upper side of the carrier device;

c) a conveyor belt, which carries the products along the substantially horizontal product conveying plane and which is configured and held on the carriage in such a manner that the conveyor belt can be moved relative to the carriage on the upper side of the carriage in the conveying direction or counter to the conveying direction, or stands still relative to the carriage when the carriage moves or when the carriage stands still, so that a movement of the products from the first position into the second position is caused by a movement of the carriage or a movement of the conveyor belt or a combination of these movements; wherein at least a section of the conveyor belt is guided in the conveying direction and counter to the conveying direction around the carriage substantially below the underside of the carriage and is held on the carrier device, further comprising a track edge regulating device attached to the carrier device, wherein the track edge regulating device is configured to control an alignment of the conveyor belt during the movement of the conveyor belt in the conveying direction, wherein the track edge regulating device comprises:

(i) at least one deflection roller for the conveyor belt, which has an adjustable axis, which is aligned substantially parallel to the horizontal product conveying plane and perpendicular to the horizontal conveying direction;

(ii) at least one sensor for determining a respective current alignment of the conveyor belt during the movement of the conveyor belt in the conveying direction; and (iii) a drive device which is designed to align the axis of the deflection roller on the basis of the current alignment of the conveyor belt respectively determined by the sensor such that the conveyor belt has a substantially straight alignment in the conveying direction during the movement of the conveyor belt.

2. The belt conveyor device according to claim 1, wherein one or more of a belt drive device, a carriage drive device, and the drive device of the track edge regulating device has an electric motor.

3. The belt conveyor device according to claim 1, further comprising a carriage drive device for the carriage mounted on the carrier device, wherein the carriage drive device is configured to move the carriage back and forth between the rear position in the conveying direction and the front position in the conveying direction.

4. The belt conveyor device according to claim 1, wherein a) the conveyor belt is an endless belt, and b) a belt drive device for the conveyor belt is mounted on the carrier device, wherein the belt drive device engages with the conveyor belt and is configured to hold and drive the conveyor belt such that the conveyor belt moves on the upper side of the carriage relative to the carriage or stands still relative to the carriage.

5. The belt conveyor device according to claim 4, wherein when the belt drive device stands still and does not drive the conveyor belt while the carriage moves from the rear position into the front position, the conveyor belt moves on the upper side of the carriage relative to the carriage.

6. The belt conveyor device according to claim 4, wherein, when the belt drive device drives the conveyor belt counter to the conveying direction while the carriage moves from the rear position into the front position, the conveyor belt does not move on the upper side of the carriage relative to the carriage.

7. A belt conveyor device for lumpy products, on which the products are conveyed in a substantially horizontal conveying direction from a first position, in which the products are received on the belt conveying device, into a second position, in which the products are discharged from the belt conveying device, the belt conveying device comprising:

a) a carriage which can be moved back and forth between a rear position in the conveying direction and a front position in the conveying direction, wherein the carriage has an upper side and an underside;

b) a stationary carrier device which is arranged below a substantially horizontal product conveying plane, wherein the carriage is movably mounted on an upper side of the carrier device;

c) a conveyor belt, which carries the products along the substantially horizontal product conveying plane and which is configured and held on the carriage in such a manner that the conveyor belt can be moved relative to the carriage on the upper side of the carriage in the conveying direction or counter to the conveying direction, or stands still relative to the carriage when the carriage moves or when the carriage stands still, so that a movement of the products from the first position into the second position is caused by a movement of the carriage or a movement of the conveyor belt or a combination of these movements; wherein at least a section of the conveyor belt is guided in the conveying direction and counter to the conveying direction around the carriage substantially below the underside of the carriage and is held on the carrier device, wherein the carriage has a front end in the conveying direction, around which the conveyor belt is guided, and the carriage has a rear end in the conveying direction, around which the conveyor belt is guided, wherein the front end or the rear end of the carriage comprises a deflection roller for the conveyor belt, wherein the conveyor belt extends from the front end and the rear end of the carriage substantially towards the carrier device and is held at the carrier device, wherein the conveyor belt has a first end assigned to the front end of the carriage and a second end assigned to the rear end of the carriage, wherein the first end and the second end of the conveyor belt is fastened to the carrier device, wherein the carriage and the conveyor belt are configured such that a distance over which the products are conveyed by the conveyor belt in the conveying direction while the carriage moves from the rear position into the front position is substantially an integer multiple of a distance over which the carriage moves from the rear position into the front position.

8. The belt conveyor device according to claim 7, wherein the distance over which the products are conveyed by the conveyor belt in the conveying direction while the carriage moves from the rear position into the front position is substantially twice the distance over which the carriage moves from the rear position into the front position.

9. The belt conveyor device according to claim 7, further comprising a carriage drive device for the carriage mounted on the carrier device, wherein the carriage drive device is configured to move the carriage back and forth between the rear position in the conveying direction and the front position in the conveying direction.

10. The belt conveyor device according to claim 7, wherein the front end of the carriage, around which the conveyor belt is guided, forms a rounded edge which has a diameter of approximately 7 to 12 mm.

11. A product discharging device for discharging lumpy products from a product stream, the product discharging device comprising:

a) a product feeding belt on which the products are fed in a substantially horizontal main conveying direction;

b) an intermediate storage belt which is arranged in the main conveying direction substantially behind or below the product feeding belt and which is configured to receive the products from the product feeding belt and is configured to convey the products further substantially in the main conveying direction; and c) a discharging belt which is arranged in the main conveying direction substantially behind or below the intermediate storage belt and which is configured to receive the products from the intermediate storage belt and convey the products further in a direction substantially transversely to the main conveying direction; wherein the intermediate storage belt is formed by a belt conveyor device, the belt conveyor device comprising:

(i) a carriage which can be moved back and forth between a rear position in the conveying direction and a front position in the conveying direction, wherein the carriage has an upper side and an underside;

(ii) a stationary carrier device which is arranged below a substantially horizontal product conveying plane, wherein the carriage is movably mounted on an upper side of the carrier device;

(iii) a conveyor belt, which carries the products along the substantially horizontal product conveying plane and which is configured and held on the carriage in such a manner that the conveyor belt can be moved relative to the carriage on the upper side of the carriage in the conveying direction or counter to the conveying direction, or stands still relative to the carriage when the carriage moves or when the carriage stands still, so that a movement of the products from the first position into the second position is caused by a movement of the carriage or a movement of the conveyor belt or a combination of these movements; wherein at least a section of the conveyor belt is guided in the conveying direction and counter to the conveying direction around the carriage substantially below the underside of the carriage and is held on the carrier device, wherein one of the intermediate storage belt, the discharging belt, or an assembly group formed jointly by the intermediate storage belt and the discharging belt is configured to be pulled out of the product discharging device transversely to the main conveying direction and counter to the conveying direction of the discharging belt.

12. A product discharging method for discharging lumpy products from a product stream carried out by the product discharging device according to claim 11.

13. A belt conveyor device for lumpy products, on which the products are conveyed in a substantially horizontal conveying direction from a first position, in which the products are received on the belt conveying device, into a second position, in which the products are discharged from the belt conveying device, the belt conveying device comprising:

a) a carriage which can be moved back and forth between a rear position in the conveying direction and a front position in the conveying direction, wherein the carriage has an upper side and an underside;

b) a stationary carrier device which is arranged below a substantially horizontal product conveying plane, wherein the carriage is movably mounted on an upper side of the carrier device;

c) a conveyor belt, which carries the products along the substantially horizontal product conveying plane and which is configured and held on the carriage in such a manner that the conveyor belt can be moved relative to the carriage on the upper side of the carriage in the conveying direction or counter to the conveying direction, or stands still relative to the carriage when the carriage moves or when the carriage stands still, so that a movement of the products from the first position into the second position is caused by a movement of the carriage or a movement of the conveyor belt or a combination of these movements; wherein at least a section of the conveyor belt is guided in the conveying direction and counter to the conveying direction around the carriage substantially below the underside of the carriage and is held on the carrier device, wherein the conveyor belt is an endless belt and a belt drive device for the conveyor belt is mounted on the carrier device, wherein the belt drive device engages with the conveyor belt and is configured to hold and drive the conveyor belt such that the conveyor belt moves on the upper side of the carriage relative to the carriage or stands still relative to the carriage, wherein when the belt drive device stands still and does not drive the conveyor belt while the carriage moves from the rear position into the front position, the conveyor belt moves on the upper side of the carriage relative to the carriage, wherein the carriage and the conveyor belt are configured such that a distance over which the products are conveyed by the conveyor belt in the conveying direction while the carriage moves from the rear position into the front position is substantially an integer multiple of a distance over which the carriage moves from the rear position into the front position.

14. The belt conveyor device according to claim 13, wherein the distance over which the products are conveyed by the conveyor belt in the conveying direction while the carriage moves from the rear position into the front position is substantially twice the distance over which the carriage moves from the rear position into the front position.

15. The belt conveyor device according to claim 13, further comprising a carriage drive device for the carriage mounted on the carrier device, wherein the carriage drive device is configured to move the carriage back and forth between the rear position in the conveying direction and the front position in the conveying direction.

16. The belt conveyor device according to claim 13, wherein, when the belt drive device drives the conveyor belt counter to the conveying direction while the carriage moves from the rear position into the front position, the conveyor belt does not move on the upper side of the carriage relative to the carriage.

* * * * *